Jan. 28, 1941. F. R. STELLING 2,230,169
METHOD OF AND MEANS FOR MANUFACTURING THE FLATS OF CHRISTMAS CRACKERS
Filed Oct. 2, 1939 4 Sheets-Sheet 2
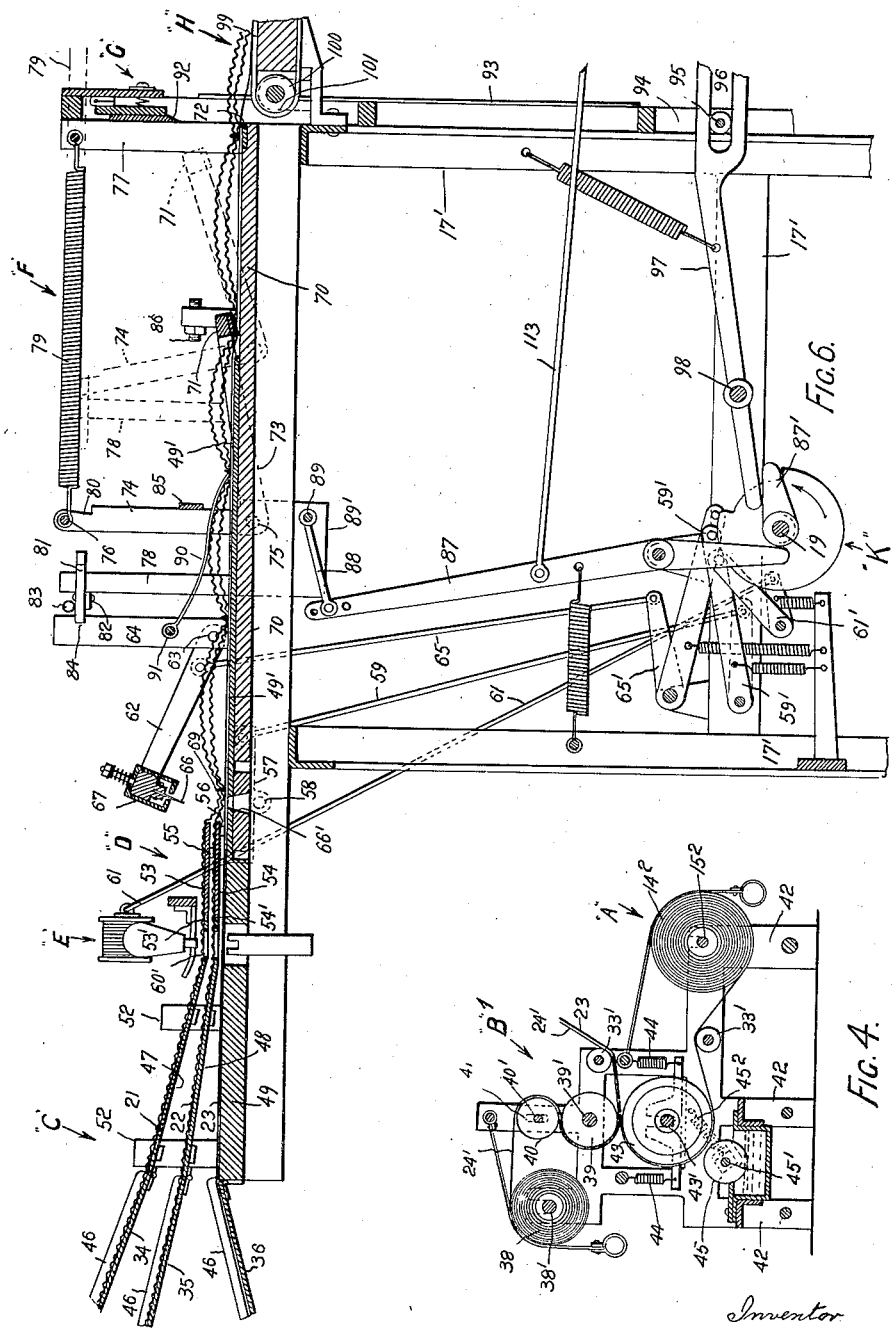
Inventor
Franz Riedl Stelling
by B. Singer
his Attorney

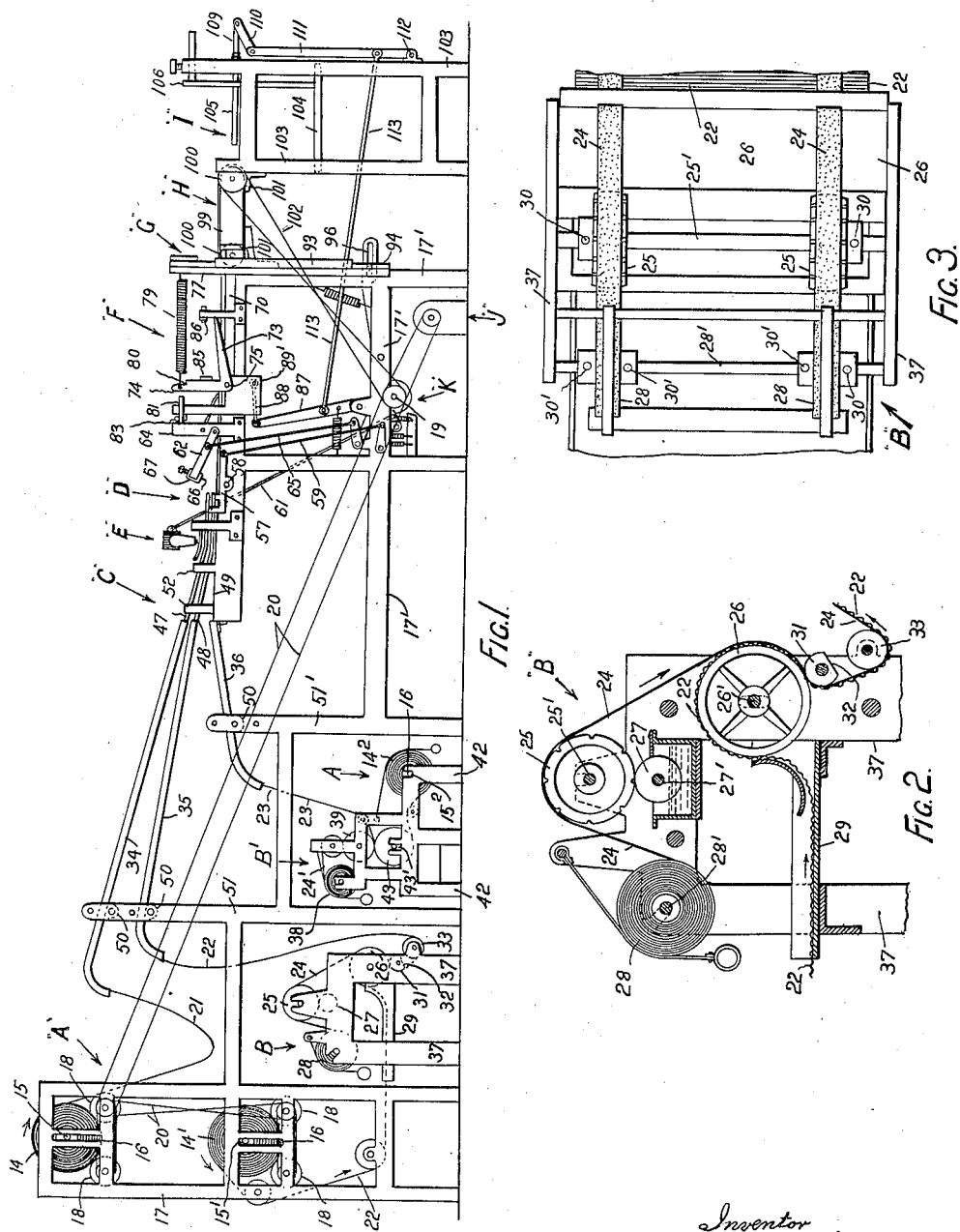

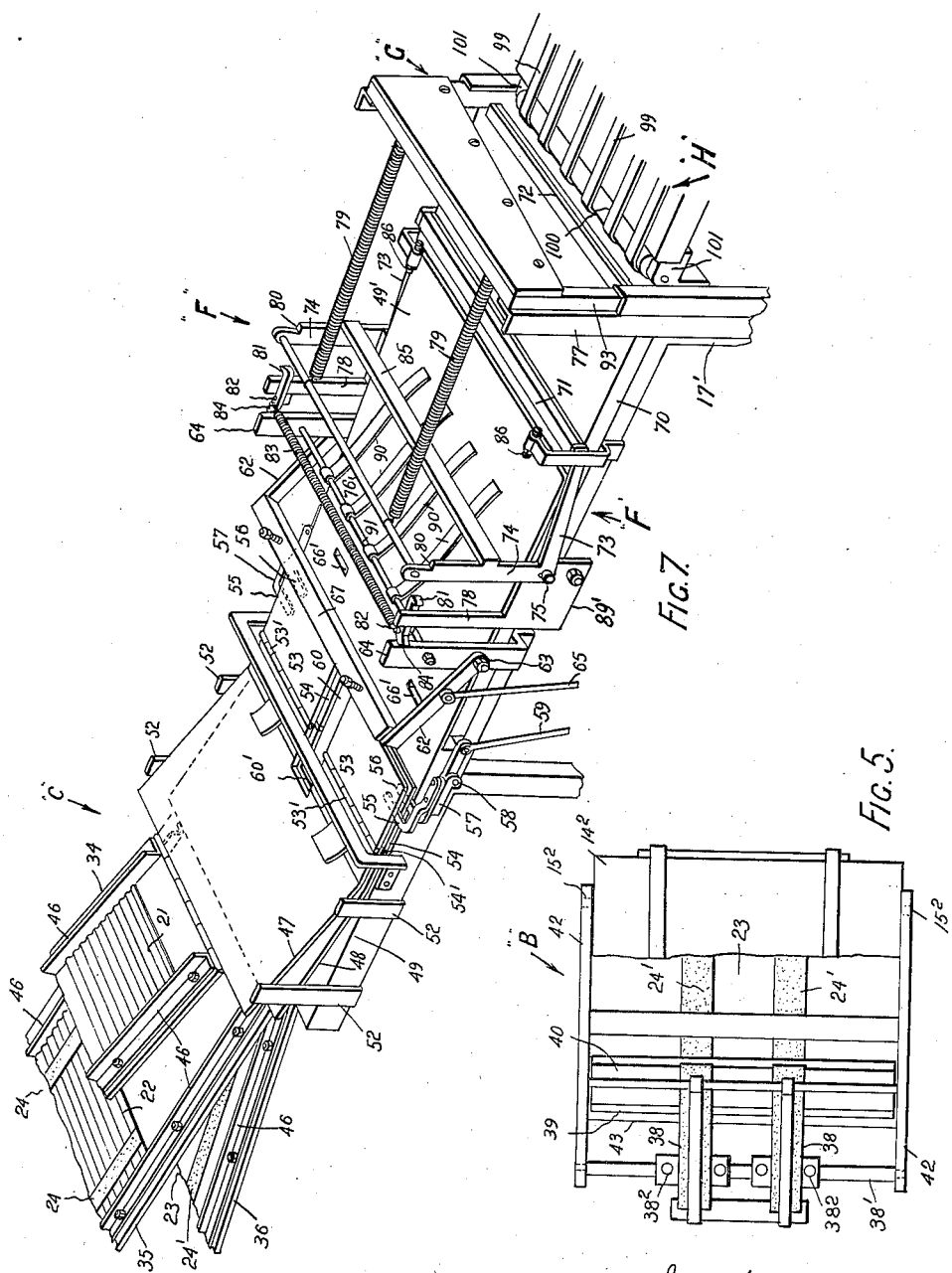

Jan. 28, 1941.  F. R. STELLING  2,230,169
METHOD OF AND MEANS FOR MANUFACTURING THE FLATS OF CHRISTMAS CRACKERS
Filed Oct. 2, 1939  4 Sheets-Sheet 4
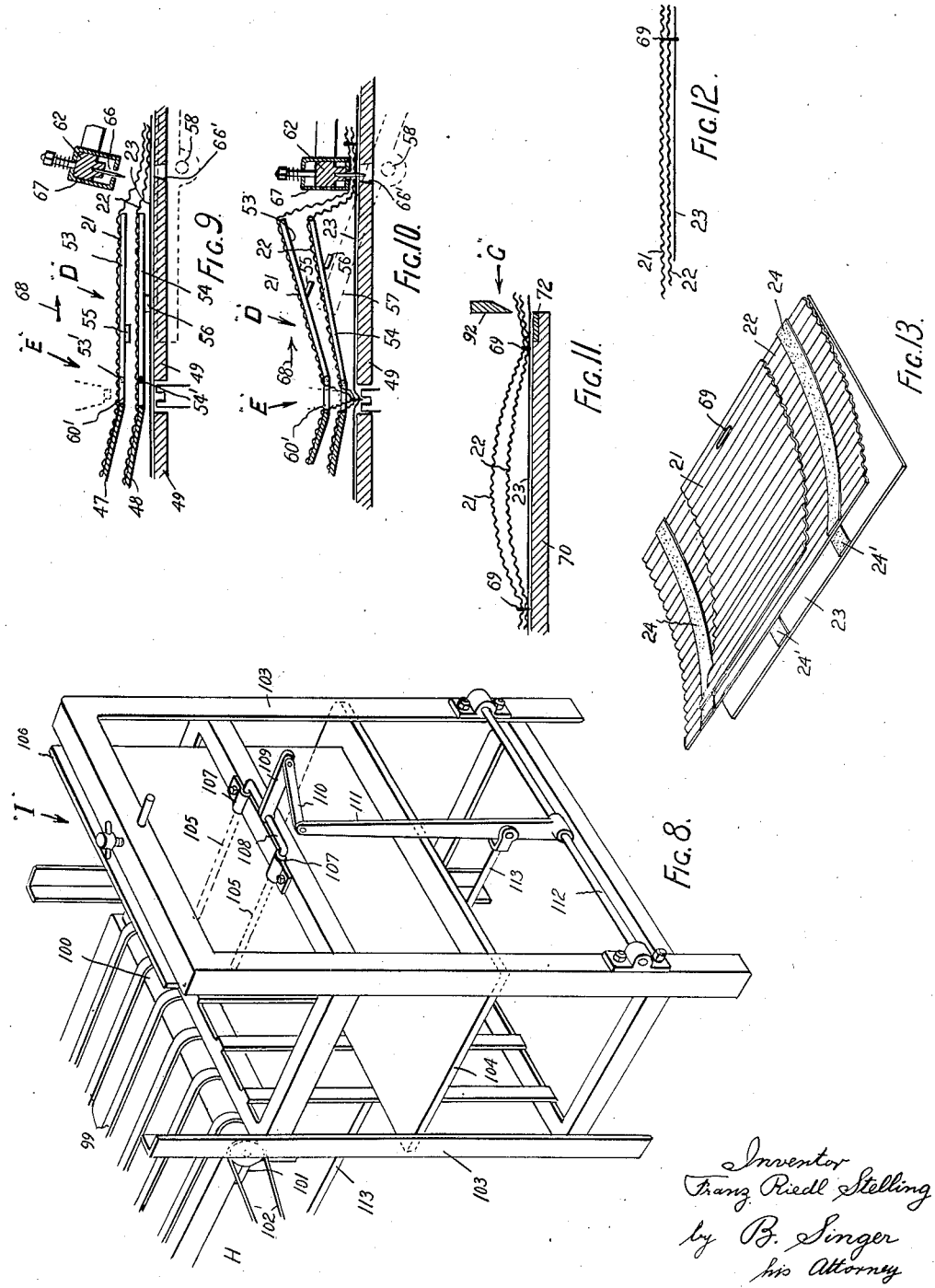
Inventor
Franz Riedl Stelling
by B. Singer
his Attorney Patented Jan. 28, 1941

2,230,169

UNITED STATES PATENT OFFICE 2,230,169

METHOD OF AND MEANS FOR MANUFACTURING THE FLATS OF CHRISTMAS CRACKERS

Franz Riedl Stelling, Waterloo, near Sydney, New South Wales, Australia

Application October 2, 1939, Serial No. 297,542
In Australia October 11, 1938

18 Claims. (Cl. 93—1)

This invention relates to the manufacture of Christmas crackers, and in particular to the manufacture of the so-called "flats" from which the body of the cracker is formed. The expression "flats for Christmas crackers" is intended to cover like formations for other purposes.

The flats comprise two or more layers of paper fastened at a point to form a unit. The sheets of paper in flats are of unequal lengths, registering along one side (the inturned side) and overlapping on the other side so that, when rolled to form the body of the cracker, the outer decorative sheet or sheets cover the narrow inner sheet of common wrapping paper.

The object of this invention is to provide a method and a machine by which the flats may be produced mechanically and at considerably greater speed and with greater accuracy than is obtained by hand manufacture. With a machine according to this invention such flats comprising two, three or more sheets may be produced at a rate of 1,800 to 2,000 per hour.

Another object of the invention is to provide means in such a machine by which one of the outer decorative sheets of the flats (usually of crepe paper), and/or the inner wrapper sheet, is formed with one or more strips of foil applied thereto as the flats are manufactured. Such strips on an outer sheet improve the appearance of the cracker, and on the inner sheet add to the permanence of the crimp in the finished cracker.

Still further objects are to provide means which prevent relative rotation of the sheets of the finished flats, and means for accurate stacking of the flats delivered from the machine.

The steps successively to be performed by the machine in accordance with the invention are:

(a) bringing several paper layers into superposed position, (b) applying to the layers one or more longitudinal strips, for instance foil strips, (c) fanning the upper layers to produce sections of paper which in different layers are of different lengths, (d) securing the layers at intervals, in the fanned condition, to form a gang, (e) progressing the gang intermittently, (f) severing completed units (the flats) from the gang, (g) conveying the cut flats from the cutting means, and (h) accurately stacking the flats.

Of these the steps (a), and (c) to (f) inclusive are essential, whilst the steps (b), (g) and (h), although preferably used in accordance with the invention, might be optionally employed, and the parts of the machine adapted for their performance might be omitted.

In order to more particularly describe the method and the machine according to the invention, reference is made to the accompanying drawings which, by way of example, depict a preferred form of the machine in accordance with the invention, and in which:

Fig. 1 is a side elevation of the entire machine,

Fig. 2 is a side elevation of the mechanism for applying decorative strips to the paper layers, Fig. 3 is a plan view of the mechanism of Fig. 2, Fig. 4 is a side view of a mechanism for applying unbacked foil strips to an inner paper layer, Fig. 5 is a plan view of the mechanism of Fig. 4, Fig. 6 is a longitudinal cross-sectional elevation showing the fanning, stitching and progressing mechanism, the flats cutting device and the cam driving mechanism of the machine.

Fig. 7 is a perspective view showing the paper feeding plates, the fanning and progressing mechanisms, the flats cutting device and the conveyor for the finished flats, Fig. 8 is a perspective view of the flats stacking device of the machine.

Figs. 9 and 10 are diagrammatic side views of the layers, of the fanning means and platen gripper showing them before and during the fanning operation respectively, Fig. 11 is a diagrammatic side view showing the fanned and secured layers before the cutting operation is effected, and Figs. 12 and 13 show a finished flat in side elevation and in perspective view respectively.

The flats making machine illustrated comprises generally a paper supply A (Fig. 1), a mechanism B (Figs. 1, 2 and 3) for applying decorative foil to an outer paper layer, a mechanism $B^1$ (Figs. 1, 4 and 5) for applying unbacked foil to an inner layer, layer guiding and separating means C (Figs. 1, 6 and 7), a fanning device D (Figs. 1, 6, 7, 9 and 10), a securing device E (Figs. 1, 6, 9 and 10), intermittently operating gripping and progressing means F (Figs. 1, 6 and 7), a severing device G (Figs. 1, 6, 7 and 11), finished flats conveying means H (Figs. 1, 6 and 8) and a stacking device I (Figs. 1 and 8). Preferably all of the said devices and means are actuated from a prime-mover J (Fig. 1) by means of a suitable driving mechanism K (Figs. 1 and 6).

The paper supply A (Fig. 1) comprises several paper rolls 14, $14^1$ and $14^2$ each on a spindle 15, $15^1$ and $15^2$ respectively. The ends of the spindles 15 and 15¹ of the supply rolls 14 and 14¹ are disposed in vertical guiding slots 16 formed in the portion 17 of the machine framing and the rolls 14, 14¹ are carried each by a pair of rollers 18. The rollers 18 are driven from the shaft 19 (Fig. 1) of the driving mechanism K by means of beltings 20 and impart the unwinding rotation to the supply rolls 14 and 14¹.

The paper layers 21, 22 and 23 are fed from the rolls 14, 14¹ and 14² respectively to the above-mentioned layer guiding and separating means C. The upper layers 21 and 22 consist preferably of decorative material, such as crepe paper, with any desired pattern and/or marginal embellishment, whereas the lowermost layer 23 may consist of ordinary wrapping paper.

The foil applying device B which is adapted to apply two spaced decorative foil strips 24, 24 (Fig. 13) to the crepe paper layer 22, comprises two domed rollers 25 (Figs. 2 and 3), which are preferably milled on their circumference, and a driven drum 26 on a shaft 26¹, said domed rollers 25 co-operating with gluing rollers 27. The foil strips 24, one side of which is backed, are fed from rolls 28 and are coated with an adhesive on the domed rollers 25 and are applied to one side of the paper layer 22 passing over drum 26, which paper layer is fed to the drum from the supply roll 14¹ over a guide track 29. The rollers 25 are adjustably mounted by set screws 30 (Fig. 3) on a spindle 25¹, the gluing rollers 27 are mounted on a spindle 27¹ (Fig. 2) and the foil rolls 28 are mounted by set screws 30¹ on a spindle 28¹. All of these rollers and rolls may be adjusted on their respective spindles in the required spaced relation.

The drum 26 is actuated by friction exerted from a driving roller 31 (Figs. 1 and 2) which, in addition, presses the foil strips 24 on to the layer 22. It is desirable to release the united crepe paper layer 22 and strips 24 on the drum 26 at intervals, so as to allow the layer to straighten up. This is achieved by forming the driving roller 31 with a flat portion 32, which during rotation of the driving roller 31 intermittently relieves the paper of pressure. From the drum 26, the layer 22 with the foil strips 24 thereon is led over an idler 33 to the guide plate 35 (Fig. 1) of the guiding and separating means C.

The rotatable parts of the device B and the guide track 29 thereof are all carried by suitable brackets or bearings on a frame 37. Thus the whole foil strip applying mechanism B may be easily removed from the machine, if no foil strips are to be applied to the flats.

Another foil applying device B¹ (Figs. 1, 4 and 5) provided in the machine is adapted to apply two spaced unbacked foil strips 24¹ to the lowermost layer 23 of ordinary wrapping paper, which strips 24¹ add to the permanence of the crimps of the finished cracker which will be formed at the point of said foil strips.

The device B¹, which carries the shaft 15² of the supply roll 14² of the paper layer 23, comprises two spaced foil supply rolls 38 adjustably mounted on a shaft 38¹ by means of set screws 38², a drum 39, revolvable on a spindle 39¹, on which the paper layer 23 and the foil strips 24¹ are united, a guide roller 40 for the foil strips 24¹ mounted on a spindle 40¹ disposed in vertical slots 41 of the frame 42 of the device, a paper guiding roller 43 on a shaft 43¹ which is yieldingly urged by springs 44 towards the drum 39, and adjustable glue rollers 45 on a shaft 45¹ which are yieldingly urged by means of springs 45² towards the paper on the guiding roller 43. Pressure between drum 43, rolls 14² and rollers 39 and 45 is ensured by the action of the springs 44, 45².

The layer guiding and separating means C (Figs. 1, 6 and 7) include three superposed and spaced guide plates 34, 35 and 36. As the layers 21, 22 and 23 may be of equal or different widths, each of the said plates is fitted with a pair of adjustable side rails 46 (Fig. 7) by means of which the width of the guiding track on each plate may be individually adapted to the width of the respective layer. The upper plates 34 and 35 are hinged to separator plates 47 and 48 respectively (Figs. 6 and 7), and the lower plate 36 is connected to a platen 49 mounted to the frame portion 17¹. The free ends of the plates 34, 35 and 36 are carried by brackets 50 (Fig. 1), which are adjustably mounted on uprights 51 and 51¹ respectively of the frame. Thus the inclination of the plates 34, 35 and 36 may be varied according to requirements.

The separator plates 47 and 48, which are mounted to lateral posts 52 (Figs. 6 and 7) converge towards the platen 49 leaving sufficient space for the passage of the layer 22 between plates 47 and 48, and of the lowermost layer 23 between the plate 48 and the platen 49.

The fanning device D (Figs. 6, 7, 9 and 10) comprises two forwardly extending and superposed pairs of blades 53 and 54. A space 60 is left between each plate of each pair of blades. The upper blades 53 are pivotally attached at 53¹ to the forward edge of the plate 47, and the lower blades 54 are similarly attached at 54¹ to the plate 48. Blade shaped pairs of fingers 55 and 56 extend from either side of the frame into the spaces between the blades 53 and 54, and between the blade 54 and the platen 49 respectively. The finger 55 and the finger 56 at either side of the machine are affixed to an arm 57, which is oscillatably mounted on a pivot 58 and is pivotally connected to a rod 59 (Fig. 6), which is linked to a spring-controlled cam follower 59¹, actuated by a cam of the driving mechanism K.

The free space 60 (Fig. 7) provided centrally between the pairs of blades 53 and 54 extends rearwardly beyond the hinging axes 53¹ and 54¹ respectively of said blades so as to form a recess 60¹ in each of the separator plates 47 and 48. A wire stitching device E (Figs. 6, 9 and 10), which is adapted to fix the superposed layers 21, 22 and 23 together at intervals, is located above said recesses 60¹. The operating mechanism of the stitcher E is intermittently driven by means of a rod 61 (Fig. 6) which is linked to a spring-controlled cam follower 61¹ actuated by one of the cams of the mechanism K.

In advance of the blades 53 and 54, and of the stitching device E, at a distance from the latter which is approximately equal to the length of one individual flat, is a gripper 62 which is oscillatably mounted at 63 (Fig. 6) to an upright 64 of the machine framing. The gripper 62 is intermittently lowered to engage, and lifted to release, the superposed paper layers on the platen 49 by means of rods 65 (Figs. 6 and 7) at either side of the machine, which rods are pivotally connected to a spring-controlled cam follower 65¹ (Fig. 6) actuated by one of the cams of the mechanism K. The gripper 62 is fitted with toothed blades 66 (Figs. 6, 9 and 10), at either side of the longitudinal axis of the machine, which penetrate the layers 21, 22 and 23, when the gripper 62 is in its operative position (Fig. 10), and so releasably bond said layers on either side of a finished stitch and prevent relative rotation about said stitch after severing of the flats. Undercut slots 66¹ (Figs. 6, 7, 9 and 10) are formed in the platen 49 to receive the toothed blades 66 in the operative position.

Spring loaded strippers 67 (Figs. 6, 7, 9 and 10) disposed about the blades 66 are adapted to force the layers off the toothed blades 66 when the gripper 62 is lifted.

From the description, and with the aid of Figs. 9 and 10 it will be understood that, as the cam follower 59¹ (Fig. 6) and the rods 59 drop, the fingers 55 and 56 on the arm 57 are brought from the normal position (Fig. 9), where the blades 53 and 54 are substantially horizontal, to the position shown in Fig. 10 in which the said blades are inclined upwardly. As the gripper 62 is meanwhile in the operative position, the paper layers 21 and 22 are "fanned" by drawing a certain length of paper from the paper supply in the direction of the arrow 68 (Figs. 9 and 10), whereas any retraction of paper in the reverse direction is effectively prevented by the gripper 62.

The stitcher E (Figs. 6, 9 and 10) is actuated while the layers are fanned (Fig. 10) so as to produce adjacent sections in the gang, one of which sections is shown in Fig. 11. In such sections, which extend between two adjacent wire stitches 69, the lowermost layer 23 is flat, whereas the upper layers 21 and 22 exceed the layer 23 in length, the top layer 21 being the longest.

The mechanism F (Figs. 1, 6 and 7) by means of which the whole gang of sections is intermittently progressed through the machine, is located in advance of the gripper 62. It comprises a reciprocable table 70 and a pivoted gripper 71 which is adapted to be reciprocated with the said table 70 and to hold the layers against the table whilst the latter advances, but to release them whilst the table 70 retracts beneath them. The table slides under an extension plate 49¹ (Figs. 6 and 7) of the platen 49, and the table is positively and momentarily locked in the fully retracted position in each reciprocation to permit severing of individual flats from the gang.

The gripper 71 is affixed at each side of the reciprocating table 70 to the arm 73 of a bell crank lever 73, 74 which is pivotally mounted at 75 to the table. The arms 74 of the levers are substantially vertical and they are interconnected by a horizontal rod 76 (Figs. 6 and 7). The frame 77 of the severing device G, and two standards 78, also are mounted on the reciprocating table 70. Tension springs 79 which extend between the rod 76 and the frame 77 urge the gripper 71 towards the layers on the table 70 (Fig. 7, and full lines Fig. 6). The upper end of each arm 74 is formed with a notch 80 adapted to co-operate with adjacent two pawls 81, each of which is mounted to swing in a horizontal plane about a vertical pivot 82 carried by one of the uprights 78. The tails 84 of the pawls 81 are outswept and are interconnected by a tension spring 83.

A crossbar 85 affixed to the arms 74 is adapted to co-operate with adjustable stops 86 carried by the frame section 17¹, when the table 70 reaches its advanced position.

The required reciprocating movement is imparted to the table 70 from a cam 87¹ (Fig. 6) on the cam shaft 19, by means of a spring controlled lever 87, which is adjustably connected through a link 88 to a horizontal rod 89, which is mounted in lower extensions 89¹ of the reciprocating table 70.

Fingers 90 are pivotally mounted above the plate 49¹ on a horizontal rod 91 which extends between the uprights 64, said fingers engaging the gang so as to prevent it being retracted with the table 70.

It will be understood that the springs 79, keep the gripper 71 in its operative position in which it forces the layers on to the table 70, as the latter moves on its forward stroke, thus progressing the gang of layers for a distance which is substantially equal to the stroke of the table. Immediately before the end of this forward stroke the crossbar 85 contacts with the stops 86 thus causing an oscillation of the bell crank levers 73, 74 on the pivots 75, against the action of the springs 79, thereby lifting the gripper 71 (dotted lines, Fig. 6). The pawls 81 engage the notches 80 on the arms 74 and maintain the gripper in the lifted position whilst the table 70 retracts, thus holding the gripper 71 clear of the layers which, during retraction of the table beneath them, are held in position on the plate 49¹ by means of the fingers 90.

Immediately before the end of the rearward stroke of the table 70 the outswept tails 84 of the pawls 81 strike against the uprights 64 thereby swinging the pawls 81 against the action of the spring 83 and releasing the arms 74. The tension of the springs 79 then causes the bell crank levers 73, 74 to swing the gripper 71 to its operative position (full lines, Fig. 6) in which it forces the layers on to the table 70 during the succeeding forward stroke of the table.

The severing device G (Figs. 1, 6 and 7) comprises the above-mentioned frame 77 which is mounted on, and reciprocates with, the table 70, and a guillotine knife 92 guided by said frame and adapted to be reciprocated in a vertical plane to cut against the steel front edge 72 of the table 70. The knife 92 itself is connected to a frame 93 (Fig. 6) formed with a downward extension 94 thereon. A stud 95 on the extension 94 engages a slot 96 formed in a spring-controlled lever 97 which is oscillatably mounted on a pivot 98 to the machine frame 17¹ and which engages the cam 87¹. The slot 96 permits the guillotine and frame 93 to follow a reciprocating movement in the horizontal and in the vertical direction. The cam 87¹ which actuates both the levers 87 and 97 is so timed that the knife 92 may accomplish a full vertical reciprocation in the frame 77 and may cut against the front edge 72 of the table 70, whilst said table is locked in its fully retracted position.

As shown in Fig. 11 the gang is cut into flat units by the guillotine 92 just ahead of each one of the wire stitches 69 and each finished flat has a configuration as shown in Figs. 12 and 13 with a wire stitch 69 near its forward end and with the uppermost sheet 21 slightly overlapping the rear edge of the intermediate sheet 22, and with the latter slightly overlapping the rear edge of the lowermost sheet 23.

Ahead of the reciprocating table 70 and of the severing device G is a conveyor H (Figs. 1, 6, 7 and 8) by which the severed flats are in turn delivered to the flats stacking device I. The conveyor comprises several endless belts 99 which continuously move on rollers 100 at a speed which exceeds the mean speed of the gang through the machine. The rollers 100 are carried by bearings 101 mounted to the frame 17¹ of the machine and of the frame 103 (Fig. 8) of the stacking device I respectively, and one of said rollers 100 is driven from the main shaft 19 by means of a belt 102 (Fig. 1).

The stacking device I (Figs. 8 and 1) is located in front of the conveyor H and comprises a stack carrier 104 and reciprocable rods 105 in a plane above said carrier 104. The rods 105 provide a temporary rest for each flat, whereon it is dressed by means of a fixed vertical baffle plate 106 (through which the rods 105 pass) disposed at suitable distance ahead of the conveyor H. The rods 105 are adapted to slide in guides 107 mounted on the frame 103, and their rear ends are joined by a yoke 108. The yoke 108 is connected for reciprocation with the rods 105 through an extension 109, a link 110, and a radial arm 111 oscillatable on a spindle 112 to a rod 113 (Figs. 1, 6 and 8) which is pivotally connected with the lever 87 and thus is actuated by the cam 87$^1$.

The rods 105 are brought into the operative position before a finished flat has been supplied from the conveyor H to the stacking device I, and are withdrawn when a flat has been delivered, and the dressed flat is dropped on to the pile of flats on the stack carrier 104.

The sequence of operations of the machine is as follows:

The layers 21, 22 and 23—the two lower layers with foil strip 24 and 24$^1$ applied thereto respectively—are introduced into both the guiding and separating device C and the fanning device D.

The fan plates 53 and 54 are lifted to draw additional paper from the supply rolls 14 and 14$^1$, whilst the reciprocable table 70 is locked in the fully retracted position, with both the platen gripper 62 and the table gripper 71 in operative position whereby any retraction of the upper layers during the fanning operation is positively prevented. Then a wire stitch 69 (Fig. 10) is applied to the layers by means of the stitching device E, whereupon the fan plates 53 and 54 drop, the platen gripper 62 rises clear of the layers, and the table 70 with the dropped table gripper 71 and with the guillotine 92 is advanced, the table 70 and the gripper 71 taking with them the layers 21, 22 and 23. Immediately before the table 70 with the layers thereon arrive in the fully advanced position, the table gripper 71 is lifted by means of the adjustable stops 86 and the platen gripper 62 is dropped. The table 70, with the guillotine 92 and the gripper 71 both in lifted position, is then retracted under the layers, which during such retraction are held stationary on the fixed platen 49 and on the extension plate 49$^1$ by means of the dropped platen gripper 62 and by the fingers 90 respectively. Immediately before the table 70 arrives in its fully retracted position the tails 84 of the pawls 81 strike against the uprights 64 and release the table gripper 71 which again drops on to the table 70. Now the guillotine 92 is actuated to sever a flat unit from the gang of the layers, immediately ahead of one of the wire stitches 69, whilst the table 70 and the guillotine 92 are locked in the fully retracted position.

The severed flats from the guillotine drop on to the conveyor H and are thereby delivered singly to the stacking device I at the forward end of the machine, where the flats are duly dressed and piled on the carrier 104.

This complete sequence is repeated continuously during the operation of the machine.

The machine may be adapted to different widths of paper strips by adjusting the walls 46 on the plates 34, 35, and 36, and flats of desired length may be obtained by adjusting the stops 86 and adjustable lever 87.

The foil strip 24, applied to paper strip 22, is preferably paper-backed foil, whilst the foil strip 24$^1$ is preferably unbacked foil.

The machine according to the invention may be modified in the shape size and/or arrangement of its parts, and several parts thereof may be omitted and other parts added without departing from the spirit of the invention.

Thus, for instance one of the foil applying devices, or both, may be omitted, or may be designed for the application of merely one, or of more than two foil strips. Any suitable number of separating plates and fanning blades may be used. Progressing means such as F, and operating therewith, may also be used in the paper supply, and particularly in the supply of the paper strip 23.

The sequence of and the timed relation in the actuation of the different parts may also be altered to some extent.

I claim:

1. A machine for the manufacture of flats for Christmas crackers, comprising means for guiding layers of paper strip into the machine and placing them into superposed position, a fixed platen, fanning blades oscillatably mounted on a fixed part of the machine and in spaced relation to said platen so that the superposed paper layers may be passed between the platen and the blades, and over the blades respectively, means for oscillating said blades at intervals to fan the paper layers by drawing a length of paper from the supply of one layer at least, means for preventing retraction of the layer or layers in the wrong direction during the fanning operation, and means for securing the layers at intervals in the fanned condition.

2. A machine for the manufacture of flats for Christmas crackers, comprising means for guiding layers of paper strip into the machine and placing them in superposed position, a fixed platen, fanning blades oscillatably mounted on a fixed part of the machine and in spaced relation to said platen so that the superposed paper layers may be passed respectively between the platen and the blades and over the blades, means for oscillating said blades to fan the paper layers, a platen gripper ahead of said fanning blades forcing the layers against the platen whilst the blades are fanning the paper layers, and means for securing said layers at intervals in the fanned condition.

3. A machine for the manufacture of flats for Christmas crackers, comprising means for guiding layers of paper strip into the machine and placing them in superposed position, a fixed platen, superposed fanning blades oscillatably mounted on a fixed part of the machine above, and in spaced relation to, said platen so that the paper layers may be passed respectively between the platen and the lower blades, between the blades and over the blades, fingers for oscillating said blades which project laterally into the space between the platen and the lower fanning blades and into the space between the superposed blades respectively, a platen gripper ahead of said fanning blades forcing the layers against the platen whilst the blades are fanning the paper layers, and means, located between the paper supply and the fanning blades and operated whilst the layers are in the fanned condition, for securing the layers in fanned condition.

4. A machine according to claim 3, wherein the superposed fanning blades are disposed in pairs with a free space left centrally between the blades of each pair.

5. A machine according to claim 3, wherein the superposed fanning blades are disposed in pairs with a central free space left between the blades of each pair, which free space extends rearwardly beyond the oscillating axis of the blades and accommodates the said means for securing the layers.

6. A machine for the manufacture of flats for Christmas crackers, comprising means for guiding layers of paper strip into the machine and placing them in superposed position, a fixed platen, pairs of fanning blades oscillatably mounted on a fixed part of the machine above, and in spaced relation to, said platen, oscillatable fingers for oscillating said blades which project respectively between the platen and blades and between the blades, a platen gripper ahead of said fanning blades forcing the layers against the platen whilst the blades are fanned, means for securing the layers operated whilst the layers are in the fanned condition, and means by which the paper layers are fed into, and intermittently progressed through the machine.

7. A machine for the manufacture of flats for Christmas crackers, comprising means for guiding layers of paper strip into the machine and placing them in superposed position, a fixed platen, pairs of fanning blades oscillatably mounted on a fixed part of the machine above, and in spaced relation to, said platen, oscillatable fingers for oscillating said blades which project respectively between the platen and blades and between the blades, a platen gripper ahead of said fanning blades forcing the layers against the platen whilst the blades are fanned, means for securing the layers operated whilst the layers are in the fanned condition, means for intermittently progressing the paper layers through the machine, and severing means actuated to sever finished flats from the secured layers whilst the intermittently operating progressing means are temporarily locked.

8. A machine for the manufacture of flats for Christmas crackers, comprising means for guiding layers of paper strip into the machine and placing them in superposed position, a fixed platen, pairs of fanning blades oscillatably mounted on a fixed part of the machine above, and in spaced relation to, said platen, oscillatable fingers for oscillating said blades which project respectively between the platen and blades and between the blades, a platen gripper ahead of said fanning blades forcing the layers against the platen whilst the blades are fanned, means for securing the layers operated whilst the layers are in the fanned condition, means for intermittently progressing the paper layers through the machine including a reciprocable table and a gripper mounted on this table which holds the paper layers against the reciprocable table whilst the latter advances and which releases the layers whilst the table retracts, and a guillotine for severing individual flats from the secured layers, and means for actuating said fanning blades, said platen gripper, said means for securing the layers, and said guillotine, in timed relation whilst the reciprocating table is locked at the end of a stroke.

9. A machine according to claim 8, in which the table gripper is spring-loaded, and the reciprocating table includes means which automatically lift the spring-loaded table gripper to an inoperative position at the end of the forward stroke of the table, and further means which retain the table gripper in this inoperative position whilst the table retracts, and which release the gripper at the end of the retraction stroke of the table.

10. A machine for the manufacture of flats for Christmas crackers, comprising means for feeding layers of paper strip into the machine in superposed position, a fixed platen, superposed pairs of fanning blades oscillatably mounted on a fixed part of the machine in spaced relation respectively to said platen and to each other, means to intermittently oscillate said fanning blades, a platen gripper ahead of said fanning blades forcing the layers against the platen whilst the blades are oscillated to fan the paper layers, a toothed blade mounted on said platen gripper, a hole in the fixed platen to receive the teeth of said blade when the platen gripper is in the operative position, and means for securing the layers at intervals in the fanned condition.

11. A machine according to claim 10, and including spring-loaded strippers disposed about the toothed blade of the platen gripper.

12. A machine for the manufacture of flats for Christmas crackers, comprising means for feeding layers of paper strip into the machine in superposed position, means adapted to fan the layers at intervals by drawing additional paper from the supply of upper layers, means for preventing retraction of the layers in the wrong direction during the fanning operation, and means for securing the layers at intervals in the fanned condition, and including a device for applying foil strip to a paper layer comprising means to unite the paper layer and foil strip by an adhesive and a drum on which the paper layer and foil strip are united by pressure.

13. A machine for the manufacture of flats for Christmas crackers, comprising means for feeding layers of paper strip into the machine in superposed position, means for fanning the layers at intervals by drawing additional paper from the supply of upper layers, means for preventing retraction of the layers in the wrong direction during the fanning operation, means for securing the layers at intervals in the fanned condition, and including a device for applying foil strip to a paper layer comprising means to unite the paper layer and foil strip by an adhesive, a drum on which the paper layer and foil strip are united by pressure and a driving roller for the drum frictionally engaging the paper layer on said drum and formed with a flattened portion so as to intermittently release the layer on the drum.

14. A machine for the manufacture of flats for Christmas crackers, comprising means for guiding layers of paper strip into the machine and placing them in superposed position, a fixed platen, pairs of fanning blades oscillatably mounted on a fixed part of the machine above, and in spaced relation to, said platen, oscillatable fingers for oscillating said blades which project respectively between the platen and blades and between the blades, a platen gripper ahead of said fanning blades to force the layers against the platen whilst the blades are fanned, means for securing the layers operated whilst the layers are in the fanned condition, means for intermittently progressing the paper layers through the machine, severing means actuated to sever finished flats from the secured layers whilst the progressing means are temporarily locked, and conveying means which remove the severed flats from the severing means at a speed which exceeds the average speed of progress of the layers through the machine.

15. A method of making flats for Christmas crackers, which comprises bringing several layers of paper strip into superposed position, alternately progressing and stopping the superposed layers, fanning the layers into sections which in different layers have different lengths by drawing additional paper from the paper supply of a layer, securing the layers in the fanned condition to form a gang, connecting the layers of paper at intervals by indentations to prevent relative rotation of the sheets in the finished flats, and severing units from the gang, the fanning, securing, indenting and severing operations being effected while the layers and the gang are temporarily stopped.

16. A method of making flats for Christmas crackers which comprises applying a foil strip to a paper layer, bringing several paper layers including that carrying the foil, into superposed position, alternately progressing and stopping the superposed layers, fanning the layers into sections which in different layers have different lengths by drawing additional paper from the paper supply of a layer, securing the layers in the fanned condition to form a gang, and severing units from the gang, the fanning, securing and severing operations being effected while the layers and the gang are temporarily stopped.

17. A method of making flats according to claim 16, in which unbacked foil strip is applied to one of the paper layers.

18. A method of making flats according to claim 16 in which decorative foil strips are applied to an upper layer.

FRANZ RIEDL STELLING.